United States Patent [19]
Wiken et al.

[11] 3,857,969

[45] Dec. 31, 1974

[54] PROCESS OF MAKING A MILK COAGULATING ENZYME PREPARATION

[75] Inventors: Torsten O. Wiken, Delft; Gerhard Bakker, Sittard, both of Netherlands

[73] Assignee: Stamicarbon N.V., Heerlen, Netherlands

[22] Filed: Feb. 1, 1974

[21] Appl. No.: 438,630

Related U.S. Application Data

[63] Continuation of Ser. No. 368,730, June 11, 1970, which is a continuation of Ser. No. 166,262, July 26, 1971, abandoned.

[30] Foreign Application Priority Data

Aug. 6, 1970   Netherlands........................ 7011613

[52] U.S. Cl..................................... 426/36, 195/65
[51] Int. Cl. ...................... C12d 13/10, A23c 19/00
[58] Field of Search................. 195/65, 66 R; 426/36

[56] References Cited
UNITED STATES PATENTS

3,549,390   12/1970   Charles et al......................... 426/36
3,616,233   10/1971   Schleich............................ 195/66 R

*Primary Examiner*—Lionel M. Shapiro
*Attorney, Agent, or Firm*—Cushman, Darby & Cushman

[57] ABSTRACT

A process for producing an enzyme preparation capable of coagulating milk by cultivating a fungi of the group *Mucor lamprosporus* or a natural or synthetic variant or mutant thereof in a culture medium containing a sufficiency of available carbon, nitrogen and trace nutrients at a temperature of between 15° and 45°C, with the incubation under aerobic conditions for a period of between 2 and 12 days. The enzyme preparation is then recovered from the medium, for example, by extraction with water or in the dissolved state by filtration and dialysis. The enzyme preparations obtained have a high milk-coagulation activity with low proteolytic and lipolytic activity.

7 Claims, No Drawings

PROCESS OF MAKING A MILK COAGULATING ENZYME PREPARATION

CROSS-REFERENCE TO RELATED APPLICATIONS

This application is a continuation of application Ser. No. 368,730 filed June 11, 1970, which is in turn a continuation of application Ser. No. 166,262 filed July 26, 1971, and now abandoned.

FIELD OF THE INVENTION

The present invention relates to a process for producing an enzyme preparation which is capable of coagulating milk and has the advantage of low proteolytic and lipolytic activity. The enzyme preparation according to the present invention is capable of replacing animal rennet in curdling milk in the cheese-making process.

DESCRIPTION OF THE PRIOR ART

In cheese-making, rennet which is recovered from the stomachs of calves, is normally used for curdling milk. The supply of rennet is therefore liable to fluctuations due to the agricultural production of calves, and alternate materials have been sought for replacing the rennet. It is known that various microorganisms produce enzymes which are capable of curdling milk, for instance, it has been proposed to recovery enzymes or mixtures of enzymes capable of replacing animal rennt from cultures of *Mucor pusillus* Lindt in U.S. Pat. No. 3,151,039. Further, it has been proposed to recover the strain *Mucor miehei* Coonet et Emerson in Dutch Patent Application No. 66.170.35.

A commercially acceptable substitute for rennet must have low proteolytic and lipolytic activity together with a high milk coagulating activity to be useful in making high quality cheese without imparting an off-flavor to the cheese. The quality of not imparting flavors to the cheeses is especially required in producing cheeses having less pronounced taste of their own, such as the Gouda and Edem type cheese. The enzymes and mixtures of enzymes proposed in the prior art have not been found to be completely acceptable in these respects.

SUMMARY OF THE INVENTION

The present invention provides enzyme preparations capable of coagulating milk which have both proteolytic and lipolytic activities and thus, will not impart off-flavors to the cheese produced from milk has been coagulated thereby. The enzyme preparations of the present invention are produced by cultivating *Mucor lamprosporus* or a natural or synthetic variant or mutant thereof in a suitable medium containing available carbon, nitrogen and trace nutrients. The enzyme preparation is then recovered from the culture medium. de

DETAILED DESCRIPTION OF INVENTION

According to the present invention, fungi of the group *Mucor lamprosporus* or natural or synthetic variants or mutante of this group are cultivated under aerobic conditions on a natural or synthetic culture medium containing carbon, nitrogen and trace nutrients. The cultivation of the fungi is accomplished at a temperature between 15° and 45°C with an incubation period of about 2 to about 12 days.

Preferred fungi useful in the present invention include the strain *Mucor lamprosporus* Lendner CBS 11808 and the strain *Mucor lamprosporus* Mehrotra CBS 411.67, both of which are obtainable from the Centraal Bureau voor Schimmeloultron at Baarn, The Netherlands. The fungi can either be cultivated on the surface of the culture medium or submerged in a solution of the culture medium. The culture medium can be of a natural material such as wheat bran or of a synthetic medium containing available carbon, nitrogen, vitamins and trace nutrients. Examples of well known nutrient sources are among others hydrolysed starch, molasses, potatoe extract, yeast extract, malt extract, cornstoop liquor, ammonium salts and phosphates.

The enzyme preparation of the present invention is recovered from the culture medium by methods well known in the field of microbiology. For instance, the preparation may be recovered by extraction with water from the surface of a culture such as Koji culture. The recovery of the enzyme preparation from a liquid culture medium in which the enzyme is submersed can be accomplished by precipitation of the enzyme by means of a solvent or a salt, or the enzyme preparation can be recovered in the dissolved state by filtration and dialysis.

Solutions of the enzyme preparation of the present invention can be sterilized by Seitz filtration and thus be preserved for future use. The enzyme solutions can also be subjected to many kinds of further treatments, e.g., concentration, spray drying (preferably with addition of a stabilizer such as lactose) or purification, for instance, by selective adsorption or selective precipitation by means of a salt.

The enzyme preparations obtained according to the invention have a high coagulation activity and possess the advantage of having low proteolytic and lipolytic activities. They are capable of completely replacing animal rennet in coagulation of milk, and in the making of cheese, the enzyme preparation can be used as a coagulant with the cheeses produced having good taste and appearance.

The invention will be further described by means of the following examples.

EXAMPLE I

An amount of 1 ml of a spore suspension of *Mucor lamprosporus* was added to 100 g of wheat bran and 70 ml of a 1% aqueous yeast extract contained in a flask. After an incubation of 7 days at 25°C, the medium was extracted with 425 ml of water and the aqueous extract was sterilized by Seitz filtration. In this way, 175 ml of a clean filtrate with a solid matter content of 2.7% by weight was obtained.

The coagulating activity of the aqueous enzyme preparation was found to be 4000 GE; one GE ("Gerinnungs-Einheit") is the quantity of coagulant causing visible curdling of 1 ml of milk in 40 minutes at 35°C. The proteolytic activity of the enzyme preparation was determined by formalin titration. In this titration a quantity of enzyme preparation was added to 125 ml of milk so that the coagulation time equaled 500 seconds. The resulting suspension was titrated with an alkaline solution and held for 36 hours whereupon formalin was added and the suspension titrated with an alkaline solution again. An uncurdled milk was similarly treated as a blank. The proteolytic activity was determined for several of the prior art curdling agents as well as rennet and the preparation obtained according to the invention from *Mucor lamprosporus*. The results are compiled in Table 1.

Table 1

| Coagulant | Amount of alkaline solution required per 10 ml of milk |
| --- | --- |
| 1.25% trypsin solution | 0.550 |
| *Mucor globosus* preparation | 0.055 |
| *Mucor pusillus* preparation | 0.040 |
| *Mucor lamprosporus* preparation | 0.017 |
| rennet | 0.017 |

As can plainly be seen from Table 1, the trypsin solution, *Mucro globosus* preparation and the *Mucro pusillus* preparation all resulted in substantial amounts of alkaline solution required per 10 ml of milk in the proteolytic determination. The *Mucor lamprosporus* preparation according to the present invention was found to result in the same amount of alkaline solution required as for rennet.

EXAMPLE II

Cheese of the Gouda variety was prepared using as a coagulant for the milk an enzyme preparation obtained according to the present invention. In all other respects, the Gouda cheese was prepared in the usual manner. After 3 weeks of aging, the average weight of the cheese was 360 g at a moisture content of 33 percent. Cheese prepared using rennet as the coagulent had an average weight after 3 weeks of 355 g. at a moisture content of 35 percent. An organoleptic examination proved that the cheese made with the coagulant of the present invention was comparable with the cheese prepared with rennet as regards consistency, color, smell and taste.

What is claimed is:

1. A process for producing an enzyme preparation capable of coagulating milk comprising the steps of cultivating a fungi of the group *Mucor lamprosporus* or a natural or synthetic variant or mutant thereof in a medium containing available carbon, nitrogen and trace nutrients, said cultivation being accomplished under aerobic conditions at a temperature of between 15° and 45°C throughout an incubation period of about 2 to about 12 days and recovery the enzyme preparation from said medium.

2. A process as claimed in claim 1, wherein the fungi is selected from the strains *Mucor lamprosporus* Lendner CBS 11808 and *Mucor lamprosporus* Mehrotra CBS 41167.

3. A process of preparing cheese, wherein the enzyme preparation obtained by the process of claim 1 is used as a coagulant.

4. A process of producing an enzyme preparation of relatively low lipolytic and proteolytic activity capable of coagulating milk under usual rennet coagulating conditions without imparting undesirable off-flavors to said coagulated milk, comprising cultivating fungi selected from the group consisting of the strains *Mucor lamprosporus* Lendner CBS 11808 and *Mucor lamprosporus* Mehrotra CBS 41167 in a medium containing available carbon, nitrogen and trace nutrients, the cultivation being under aerobic conditions at a temperature of between about 15°C. and about 45°C., said temperature maintained throughout an incubation period of about 2 to about 12 days and recovering the enzyme preparation from said medium.

5. In a process for making cheese including the step of preparing curds from milk by contacting the milk with a milk coagulating enzyme, the improvement which comprises employing as the sole milk coagulating enzyme of claim 4.

6. The process as claimed in claim 4, wherein said fungi is *Mucor lamprosporus* Lendner CBS 11808.

7. The process as claimed in claim 4, wherein said fungi is *Mucor lamprosporus* Niehrotra CBS 41167.

* * * * *